(12) United States Patent
Justiss (10) Patent No.: US 7,552,294 B1
(45) Date of Patent: Jun. 23, 2009

(54) SYSTEM AND METHOD FOR PROCESSING MULTIPLE CONCURRENT EXTENDED COPY COMMANDS TO A SINGLE DESTINATION DEVICE

(75) Inventor: Steven A. Justiss, Lakeway, TX (US)

(73) Assignee: Crossroads Systems, Inc., Austin, TX (US)

( * ) Notice: Subject to any disclaimer, the term of this patent is extended or adjusted under 35 U.S.C. 154(b) by 346 days.

(21) Appl. No.: 11/020,960

(22) Filed: Dec. 22, 2004

Related U.S. Application Data (63) Continuation-in-part of application No. 10/636,042, filed on Aug. 7, 2003.

(51) Int. Cl.
G06F 12/00 (2006.01)
G06F 13/00 (2006.01)
G06F 13/28 (2006.01)

(52) U.S. Cl. ........................ 711/161; 711/154; 711/157

(58) Field of Classification Search ................ None
See application file for complete search history.

(56) References Cited

U.S. PATENT DOCUMENTS

| | | | |
|---|---|---|---|
| 5,515,502 A | 5/1996 | Wood | |
| 5,576,903 A | 11/1996 | Brown et al. | |
| 5,950,218 A | 9/1999 | Howard | |
| 5,974,563 A | 10/1999 | Beeler, Jr. | |
| 6,038,613 A | 3/2000 | Garcia et al. | |
| 6,049,848 A | 4/2000 | Yates et al. | |
| 6,058,389 A | 5/2000 | Chandra et al. | |
| 6,076,148 A | 6/2000 | Kedem | |
| 6,219,770 B1 | 4/2001 | Landau | |
| 6,397,309 B2 | 5/2002 | Kedem et al. | |
| 6,400,730 B1 | 6/2002 | Latif et al. | |
| 6,415,296 B1 | 7/2002 | Challener et al. | |
| 6,460,113 B1 | 10/2002 | Schubert et al. | |
| 6,487,644 B1 * | 11/2002 | Huebsch et al. ............. 711/162 |
| 6,505,216 B1 | 1/2003 | Schutzman et al. | |
| 6,532,124 B1 | 3/2003 | Takafumi | |
| 6,622,142 B1 | 9/2003 | Murray et al. | |
| 6,675,257 B1 | 1/2004 | Khalid et al. | |
| 6,704,836 B1 | 3/2004 | Griswold, Jr. et al. | |
| 6,757,794 B2 | 6/2004 | Cabrera et al. | |
| 6,892,199 B2 | 5/2005 | Hong et al. | |
| 6,922,761 B2 | 7/2005 | O'Connell et al. | |
| 6,931,501 B1 | 8/2005 | Narayanaswamy et al. | |

(Continued)

OTHER PUBLICATIONS

Exabyte Corporation,Why Choose Native Fibre Backup?,Jul. 2001.*

(Continued)

*Primary Examiner*—Hyung S Sough
*Assistant Examiner*—Gary W Cygiel
(74) *Attorney, Agent, or Firm*—Sprinkle IP Law Group (57) ABSTRACT

Embodiments of the present invention provide systems and methods for processing concurrent extended copy commands. One embodiment can include a method for processing multiple extended copy commands that comprises receiving at least two extended copy commands that specify the same destination device, reading data from source devices specified in the extended copy commands; and writing data to the destination device in the order the data is received from the source devices, wherein the data written to the destination device comprises intermingled data corresponding to the multiple threads. Thus, embodiments of the present invention can interleave data from multiple threads to a destination device.

28 Claims, 7 Drawing Sheets

U.S. PATENT DOCUMENTS

| | | | |
|---|---|---|---|
| 6,973,455 | B1 | 12/2005 | Vahalia et al. |
| 7,051,173 | B2 | 5/2006 | Tsuchiya et al. |
| 2001/0042222 | A1 | 11/2001 | Kedem |
| 2002/0004857 | A1 | 1/2002 | Arakawa |
| 2002/0042866 | A1 | 4/2002 | Grant |
| 2002/0083281 | A1 | 6/2002 | Carteau |
| 2002/0144069 | A1 | 10/2002 | Arakawa |
| 2002/0146035 | A1 | 10/2002 | Tyndall |
| 2002/0156942 | A1 | 10/2002 | Tyndall |
| 2002/0184463 | A1 | 12/2002 | Arakawa |
| 2002/0188697 | A1 | 12/2002 | O'Connor |
| 2002/0199073 | A1 | 12/2002 | Tamura |
| 2003/0014433 | A1 | 1/2003 | Teloh |
| 2003/0014534 | A1 | 1/2003 | Watanabe |
| 2003/0018657 | A1 | 1/2003 | Monday |
| 2003/0212700 | A1 | 11/2003 | Basham |
| 2004/0107226 | A1 | 6/2004 | Autrey et al. |
| 2004/0148283 | A1 | 7/2004 | Harris et al. |
| 2004/0236868 | A1 | 11/2004 | Martin et al. |
| 2004/0243736 | A1 | 12/2004 | Hattrup et al. |
| 2005/0076264 | A1 | 4/2005 | Rowan et al. |
| 2005/0165868 | A1 | 7/2005 | Prakash |
| 2005/0172093 | A1 | 8/2005 | Jain |

OTHER PUBLICATIONS

ATTO Technology Inc., Intelligent Bridging Architecture, Jun. 2002.*

Microsoft, Microsoft Computer Dictionary, 2002, Microsoft Press, 5$^{th}$ ed., p. 474.*

Sudlow, Paul, Server-free Backup:Under the Covers, 2001, Crossroads Systems, 11 pages.*

Wilson, Extended Copy Command, T10, found at http://www.T10.org/, 34 pgs, Apr. 1999.

U.S. Patent Official Action issued Jul. 19, 2007 in U.S. Appl. No. 11/020,971, Justiss.

"Requirements to consider when you use a backup solution with Windows server clusters", as accessed via http://support.microsoft.com, 2 pages, May 14, 2008.

"Serverless backup—Term Description", as accessed via http://www.liutilities.com/products/winbackup/backupterms/serverlessbackup, 2 pages, May 14, 2008.

Furman, Keith "2GB Serverless Backup Consortium Formed", Windows IT Pro, accessed via http://windowsitpro.com, 2 pages, Jan. 14, 2002.

"SearchStorage.com Definitions", as accessed via http://searchstorage.techtarget.com, 2 pages, May 14, 2008.

Sudlow, Paul, "Server-free Backup: Under the Covers", Crossroads Whitepaper, Crossroads Systems UK, 11 pages.

"Crossroads Storage Router Primer", Crossroads Systems, Inc., 5 pages.

"Serverless Backup", Spectra, accessed via http://www.spectralogic.com/index/cfm, 1 page, May 19, 2008.

"IBM Almaden Research Center: Projects—Serverless Backup", International Business Machines, accessed via http://www.almaden.ibm.com, 2 pages, May 19, 2008, Asaro, Tony, et al. "ESG Lab Report: Cisco MDS 9000 Network Accelerated Serverless Backup: A validation study by ESG Lab", Enterprise Strategy Group, Inc., 20 pages, Jan. 2006.

Office Action issued in U.S. Appl. No. 11/020,971 dated Feb. 8, 2008.

* cited by examiner

FIGURE 6B

SYSTEM AND METHOD FOR PROCESSING MULTIPLE CONCURRENT EXTENDED COPY COMMANDS TO A SINGLE DESTINATION DEVICE

RELATED INFORMATION

This application is a continuation-in-part of, and claims benefit under 35 U.S.C. §120 to U.S. patent application Ser. No. 10/636,042 entitled "System and Method for Manipulating and Reporting a Log of Multi-Threaded Backups" by Justiss and Sims, filed Aug. 7, 2003, which is hereby fully incorporated by reference herein.

TECHNICAL FIELD OF THE INVENTION

Embodiments of the invention relate generally to storage and retrieval of data and more particularly to systems and methods of processing concurrent extended copy commands.

BACKGROUND

Businesses, governmental organizations and other entities are increasingly saving large volumes of data necessary for daily operations. In order to provide proper protection of data for business and legal purposes (e.g., to ensure quick recovery of data in the event of a disaster or to comply with document retention requirements), entities often back up data to a physical media, such as magnetic tapes, on a regular basis. Traditional backup systems placed an application server, backup server, source device, destination device and a local area network ("LAN") in the data path of backup operations. Under these systems, the LANs were becoming overburdened by the amount of data being copied and often the backup window was too short to achieve a complete backup of data. Many entities have now implemented Storage Area Networks ("SAN") to relieve much of the burden of mass data storage and backup from the LAN, freeing the LAN for more immediate data storage and manipulation operations.

Many SANs utilize a Fibre Channel-to-SCSI architecture in which SCSI storage devices are connected to Fibre Channel-to-SCSI routers. This allows data to be transferred across the SAN with the speed of Fibre Channel while using well defined SCSI commands. The T10/99-143r1, "Working Draft SCSI Extended Copy Command" (the "99-143r1 Draft") and NCITS T10 SPC-2 (SCSI Primary Commands-2) ("SPC-2") provide a mechanism for computer backup application to delegate actual data movement to third party devices known as "copy manager devices" or "data mover devices".

The copy manager devices move data from source devices to destination devices as designated by the backup application in "segment descriptors" which in part constitute the parameter list of an extended copy command. The SPC-2 standard contemplates that a copy manager device may process some number of concurrent extended copy commands that specify different destination devices.

The extended copy command is often used to backup data from random access devices, such as hard drives, to sequential access devices, such as tape drives. When the backup medium is a tape, the copy manager device strives to keep the tape moving by streaming data to the tape in order to maximize performance. To keep the drive streaming, copy manager devices often use some form of disk data pre-fetch, or "read ahead," so that the copy manager has enough data in its memory to build the next tape write command when an active tape write command completes.

With the advent of new, higher-speed, tape drives, copy manager devices have difficulty pre-fetching enough data from source devices to effectively keep the tape drive streaming. This reduces the efficiency of backup operations and can create data gaps on a tape.

SUMMARY OF THE INVENTION

Embodiments of the present invention provide a system and method of processing extended copy commands that eliminates, or at least substantially reduces, the shortcomings of prior art systems and methods for dealing with extended copy commands.

One embodiment of the present invention can include a method for processing multiple extended copy commands that comprises receiving at least two extended copy commands that specify the same destination device, reading data from source devices specified in the extended copy commands, and writing data to the destination device. The data written to the destination device can comprise intermingled data corresponding to the at least two threads.

Another embodiment of the present invention provides a method of processing multiple extended copy commands that comprises receiving at least two extended copy commands specifying the same destination device, reading data blocks from source devices based on the multiple extended copy commands, storing data blocks received in response to the read commands in one or more buffers and writing intermingled blocks of data corresponding to at least two threads to the destination device.

Another embodiment of the present invention can include a routing device that acts as a third party copy device. The routing device can comprise a first interface to connect to a first data transport medium, a second interface to connect to a second data transport medium, a set of buffers and a processing unit connected to the first interface, the second interface and the set of buffers. The processing-unit can be operable to determine a set of source devices from at least two extended copy commands referencing the same destination device, send read commands based on the at least two extended copy commands to the set of source devices based on segment descriptors in the at least two extended copy commands, store data corresponding to the at least two threads in the set of buffers and generate write commands to the destination device to write intermingled data corresponding to the at least two threads to the destination device.

Yet another embodiment of the present invention can include a computer program product comprising a set of computer instructions stored on a computer readable medium. The set of computer instructions can comprise instructions executable to determine a set of source devices from at least two extended copy-commands referencing the same destination device, send read commands based on the at least two extended copy commands to the set of source devices based on segment descriptors in the at least two extended copy commands, store data corresponding to multiple threads and generate write commands to the destination device to write intermingled data corresponding to at least two threads to the destination device.

Embodiments of the present invention provide an advantage over prior art systems and methods of handling extended copy commands by allowing multiple threads to be concurrently written to a single destination device.

Embodiments of the present invention provide another advantage by allowing a copy manager device to more efficiently utilize high speed sequential access media such as tapes.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for processing multiple concurrent extended copy commands that specify the same destination device. Each extended copy command specifies, through segment descriptors, a thread of data to be moved from one or more source devices to a destination device. The present invention can interleave threads, that is intermingle data from different threads, to the same destination device. For example, according to one embodiment, the present invention can intermingle data by sending blocks of data from different threads to the destination device in an arbitrary order. (i.e., FIFO based, LIFO based, priority based). Each block of data can contain data from a particular thread. By intermingling data from multiple threads, embodiments of the present invention can more efficiently utilize high-speed sequential destination devices when compared to prior art systems that would either write threads sequentially or write different threads to different destination devices.

Figure 1:
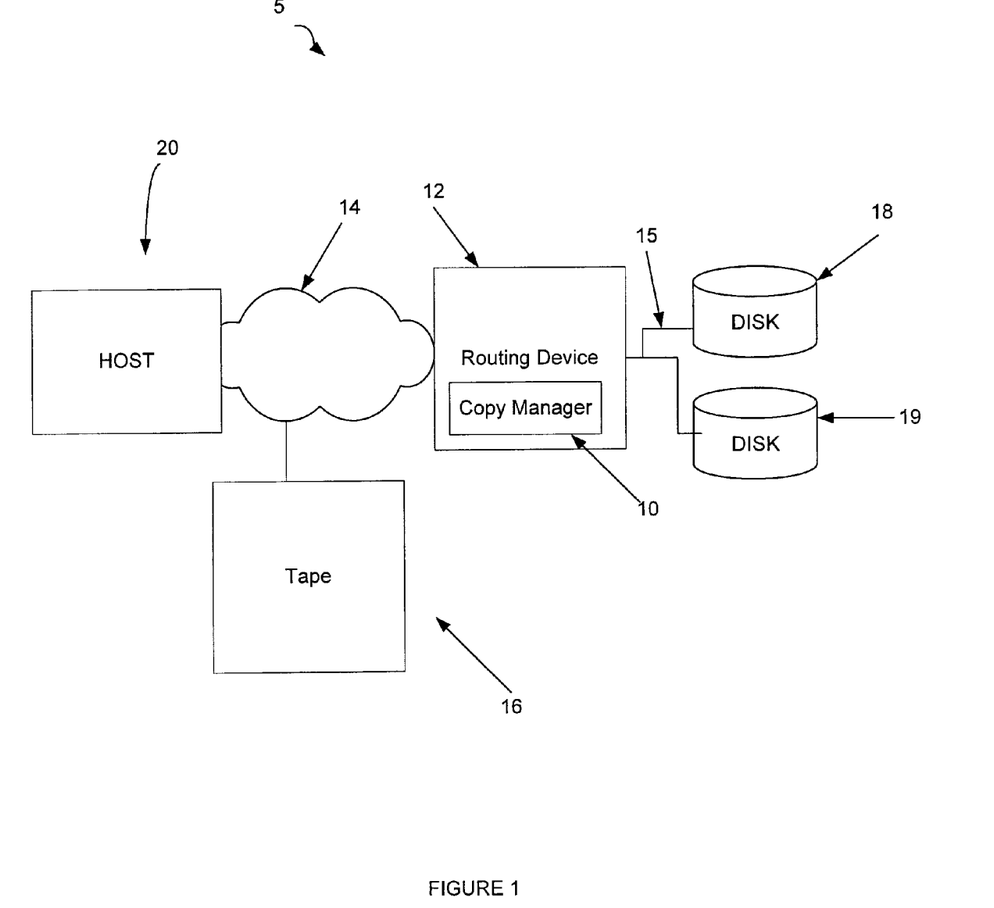
FIG. 1 is a diagrammatic representation of a system for carrying out an extended copy command according to one embodiment of the present invention.

FIG. 1 is a diagrammatic representation of a system 5 for carrying out an extended copy command according to one embodiment of the present invention. In this embodiment, a copy manager program 10 capable of processing an extended copy command can be located at a routing device 12, such as a storage router 12. For the sake of example, storage router 12 can be a fibre channel-to-SCSI router. However, it should be noted that copy manager program 10 can be located at any device in the command path capable of processing the extended copy command and is not limited to being implemented at routers. Moreover, it should be understood that the copy manager program 10 can be implemented in other routing devices including, but not limited to: Fibre Channel to Fibre Channel routers; SCSI to SCSI routers; iSCSI to iSCSI routers; Fibre Channel to iSCSI routers; iSCSI to Fibre Channel routers; iSCSI to SCSI routers; SCSI to iSCSI routers; Fibre Channel to Infiniband routers; Infiniband to Fibre Channel routers; iSCSI to advanced technology attachment ("ATA") routers; ATA to iSCSI routers; iSCSI to Serial ATA ("SATA") routers; Serial ATA to iSCSI routers; Fibre Channel to Serial Attached SCSI routers; Serial Attached SCSI to Fibre Channel routers; iSCSI to Serial Attached SCSI routers; Serial Attached SCSI to iSCSI routers; Fibre Channel to ATA routers; ATA to Fibre Channel routers; Fibre Channel to SATA routers; SATA to Fibre Channel routers; Fibre Channel to Serial SCSI Architecture routers; Serial SCSI Architecture to Fibre Channel routers; Infiniband to Serial Attached SCSI routers; Serial Attached SCSI to Infiniband routers and other routers, bridges, hubs, switches or other devices supporting protocols that use the extended copy command.

In the embodiment of FIG. 1, routing device 12 is coupled to a first storage device 16 (e.g., a tape drive 16, an optical storage device, a hard drive) and a host 20 by a fibre channel data transport medium 14 and to a second data storage device 18 (e.g., hard disk drive 18 or other storage device) and a third storage device 19 (e.g., hard disk drive 19 or other storage device) by a second data transport medium (e.g., a SCSI data transport medium) 15. It should be noted that, although the embodiment described in detail herein uses a router coupled to tape and disk drives by SCSI and Fibre Channel interconnects, alternative embodiments may use SAN attached appliances other than routers, and they may use other types of interconnects, including SCSI, iSCSI, InfiniBand, ATA, SATA, serial attached SCSI or any other interconnect that allows transport of extended copy commands. Moreover, copy manager program 10 can be located at other third party copy devices, such as servers, switches, stand-alone third party copy devices or other network device and can transfer data between various storage devices including, but not limited to, optical drives, tape drives, hard drives, redundant arrays of independent disks ("RAID") devices and other devices known in the art.

Host 20 is capable of accessing the other components of the network via the corresponding Fibre Channel interconnects. Particularly, host 20 is capable of accessing router 12 to delegate to it the management of copy tasks involving other network components, such as tape drive 16 and hard disk drives 18 and 19. This can be accomplished through the use of extended copy commands issued by host 20 to router 12. Router 12 processes these extended copy commands, reading data from one of the network devices and writing (copying) the data to another one of the components.

The use of extended copy commands allows host 20 to use its own processing power on tasks other than the mere movement of data between network components. For example, it is possible for host 20 to back up hard disk drive 18 and hard disk drive 19 to tape drive 16 (a potentially lengthy process) by issuing one or more corresponding extended copy commands to router 12. Router 12 can then copy the backup data from the hard disk drives to the tape drive without the intervention of host 20. Similarly, host 20 can issue one or more extended copy commands to restore data from the tape drive 16 to the hard disk drive 18 and the hard disk drive 19. The restoration process can similarly take place without the intervention of host 20.

According to one embodiment of the present invention, host 20 can issue multiple concurrent extended copy commands to router 12 to transfer data from any number of storage devices to a single storage device. Host 20 can issue multiple extended copy commands (or multiple hosts can issue extended copy commands) to transfer data from several random access storage devices (e.g., hard drives) to a single streaming or sequential storage device (e.g., a tape drive or other sequential storage device).

According to one embodiment of the present invention, copy manager program 10 can concurrently process multiple extended copy commands that specify data transfer from multiple source devices to a single destination device. For example, copy manager program 10 can concurrently process an extended copy command specifying the transfer of data from hard disk drive 18 to tape drive 16 and an extended copy command specifying the transfer of data from hard disk drive 19 to tape drive 16. Copy manager program 10 can interleave the data received from hard disk drive 18 and hard disk drive 19 to produce a data stream to tape drive 16. Interleaving data from multiple sources can allow the copy manager to keep the sequential access device streaming even when the sequential access target device can receive data faster than the data can be written to that device from a single source device.

Figure 2:
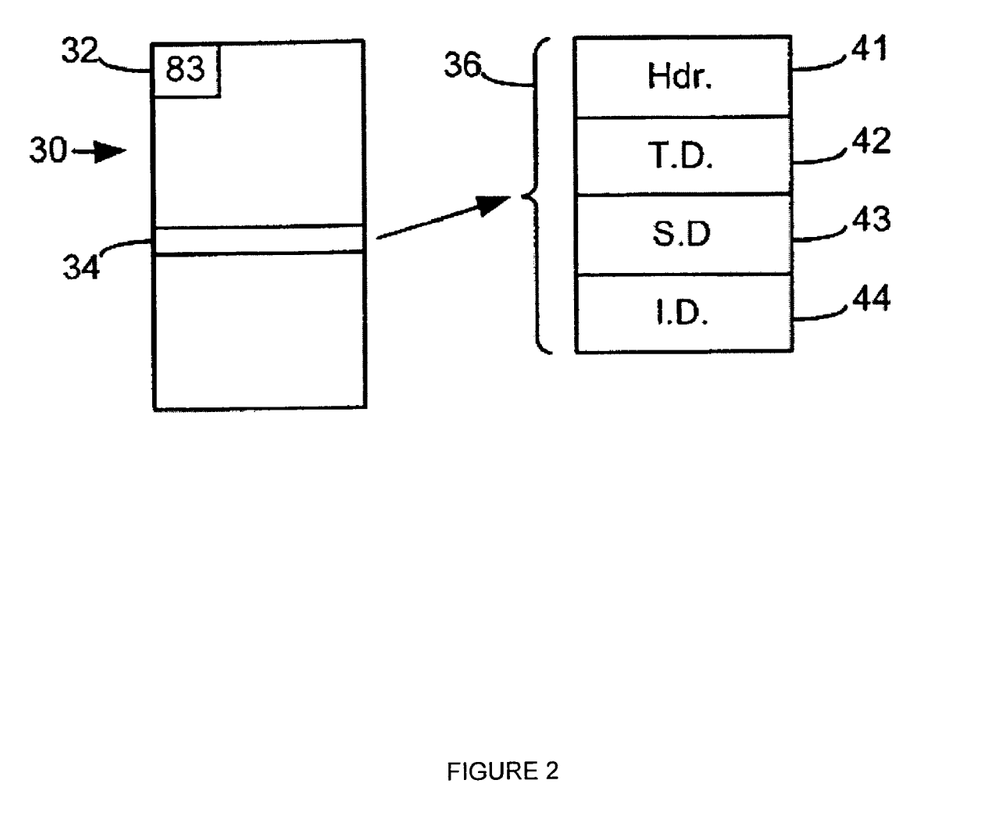
FIG. 2 provides a diagrammatic representation of an extended copy command.

FIG. 2 provides a diagrammatic representation of an extended copy command. As shown in the example of FIG. 2, extended copy command 30 has an opcode 32. In this instance, the opcode is a hexadecimal "83". The command format includes a field 34 that is a count of the size of a list 36 in the data. List 36 has a header 41, a set of target descriptors 42, a set of segment descriptors 43 and in-line data 44.

The target descriptors 42 describe the target devices that will be involved in the extended copy task. The target devices typically include the source device (i.e., the device from which data will be read) and the destination device (i.e., the device to which the data will be written). The target device (source or destination) is typically a magnetic tape device, a magnetic disk device, an optical media device, or a write-once media ("WORM") device as specified in the SPC-2 specification, but may be another storage device known in the art. A single extended copy command can specify data to be transferred from multiple sources to a destination. The host is typically a Solaris box, a Windows 2000 server, or other device capable of issuing an extended copy command. The source, destination and host devices may, however, be any of a number of different devices. The router or other box in which the present invention is implemented may also vary from one embodiment to another. These devices may have different characteristics, such as the maximum amount of memory that is (or may be) available for transferring data using extended copy commands.

The segment descriptors 43 describe the types of operations that will be performed, as well as the amount of data that will be transferred. For example, a segment descriptor may indicate that block data will be read from a hard disk drive and written to a tape drive (both of which are referenced by the target descriptors). The segment descriptors may describe backup operations, restore operations, block-to-block operations, or other data storage operations. Additionally, segment descriptors can specify metadata to be written to a destination device along with the data from the source device. In a block-to-stream operation, the metadata can be specified as "inline to stream" or "embedded to stream" as defined by the NCITS T10 SPC-2 Extended Copy Command specification. The preferred embodiment is an SPC-2 implementation that supports 8448 segment descriptors or a 99-143r1 Draft implementation that supports 512 segment descriptors. Each of the segment descriptors can move up to 32 MB of data. Thus, a very large amount of data may potentially be moved through a single extended copy command.

"Inline to stream" data, such as inline data 44, and "embedded to stream" data may or may not be present. Such data is provided by the host application to describe the data being backed up. This information may later be used, for example, to enable the backed up data to be restored from the tape to the disk. The SPC-2 standard also allows the use of embedded data segment descriptors to serve the same purpose as inline data segment descriptors.

Figure 3:
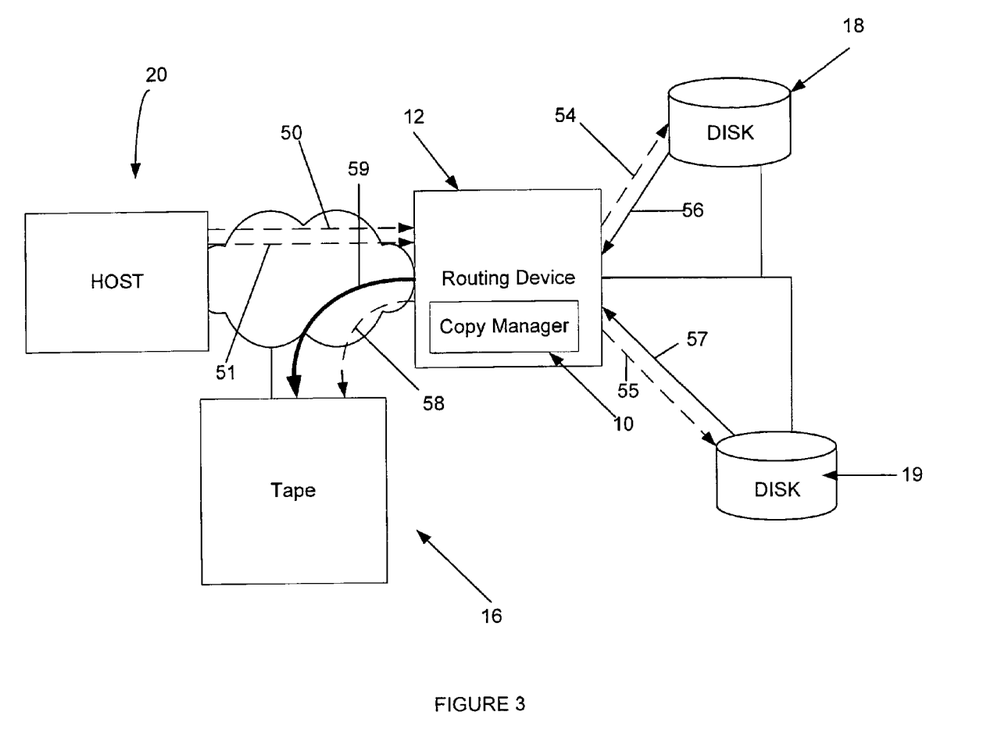
FIG. 3 is a diagrammatic representation of the flow of extended copy commands and corresponding data flows according to one embodiment of the present invention.

FIG. 3 is a diagrammatic representation of the flow of an extended copy command and corresponding data flow according to one embodiment of the present invention. FIG. 3 includes the example network structure shown in FIG. 1, and also includes lines depicting the flow of commands and data through the system during a backup operation that is performed using extended copy commands. Data flows 50 and 51 represent the issuance of extended copy commands from host 20. In this example, extended copy command 50 instructs the routing device 12 to transfer data from hard disk drive 18 to tape drive 16 and extended copy command 51 instructs routing device 12 to transfer data from hard disk drive 19 to tape drive 16.

When copy manager program 10 receives the extended copy command, routing device 12 can determine the source and destination device from the target descriptors. Copy manager program 10 can construct test unit ready ("tur") commands and send the "tur" commands to the source and destination devices to clear unit attentions. One embodiment of a method for clearing unit attentions that can be employed by copy manager program 10 is described in U.S. patent application Ser. No. 10/848,177, entitled "System and Method for Unit Attention Handling", filed May 18, 2004, to Tyndall, Justiss and Gao, which is hereby fully incorporated by reference herein.

Copy manager program 10 can send read commands (represented by data flow 54) to hard disk drive 18 and read commands (represented by data flow 55) to hard disk drive 19 and begin receiving data from the hard disk drive 18 and hard disk drive 19 (represented by data flows 56 and 57, respectively). Copy manager program 10 can further construct write commands and issue the write commands to tape drive 16 (represented by line 58) to write data received from hard drive 18 and hard drive 19 to tape drive 16 (represented by dataflow 59). According to one embodiment of the present invention, the data written to tape drive 16 can include data that was received by copy manager program 10 from both hard drive 18 and hard drive 19.

In the example above, routing device 12 is only reading data from one source device for each extended copy command. However, an extended copy command can specify multiple source devices. Accordingly, for each extended copy command received, routing device 12 may issue read commands to more than one source device for each extended copy command.

According to one embodiment of the present invention, when the extended copy command is executed, copy manager program 10 identifies the target devices and goes through the segment descriptors sequentially. For each of the segment descriptors, the copy manager program builds corresponding read commands to be issued to the source device and write commands to be issued to the destination device. When these read and write commands are issued to the respective devices, they serve to transfer data from the source device to the destination device. There may be multiple read and/or write commands for each segment descriptor.

In some instances, data may not be written to the destination device at the same rate at which it is read from the source device. For example, data may be read from a disk in chunks of 256 kB and then be written to a tape in chunks of 64 kB. Internal buffers (e.g., 16 kB buffers) can be used to buffer data until the copy manager program is ready to send data to the destination device. According to other embodiments of the present invention, the destination device may be able to receive data faster than the data can be read from the source devices.

Copy manager program 10, according to one embodiment of the present invention, can concurrently execute multiple extended copy commands that have the same destination device specified. For each extended copy command, copy manager program 10 can issue read commands to the appropriate source devices and can queue the received data. Copy manager program 10 can then construct and issue write commands to the destination device to send data to that device. The data flow to the destination device can include data that was retrieved based on multiple extended copy commands interleaved together. According to one embodiment of the present invention, the copy manager program 10 can intermingle data from various sources by writing blocks of data to the destination device in the order they are received from the source devices, with each block of data written to destination device containing data corresponding to a particular extended copy command. These blocks of data may include some portion of metadata taken from Inline Data segment descriptors.

Generally, a set of data corresponding to a particular extended copy command is referred to as a thread, whether read from a single source device or multiple source devices. Thus, the data sent to the destination device can include intermingled data corresponding to multiple threads (i.e., to multiple extended copy commands). This situation should be distinguished from concurrent extended copy commands as referenced in the NCITS t10 SPC-2 Extended Copy Command specification in which "concurrent" extended copy commands are implemented to write threads to different destination tape drives.

Figure 4:
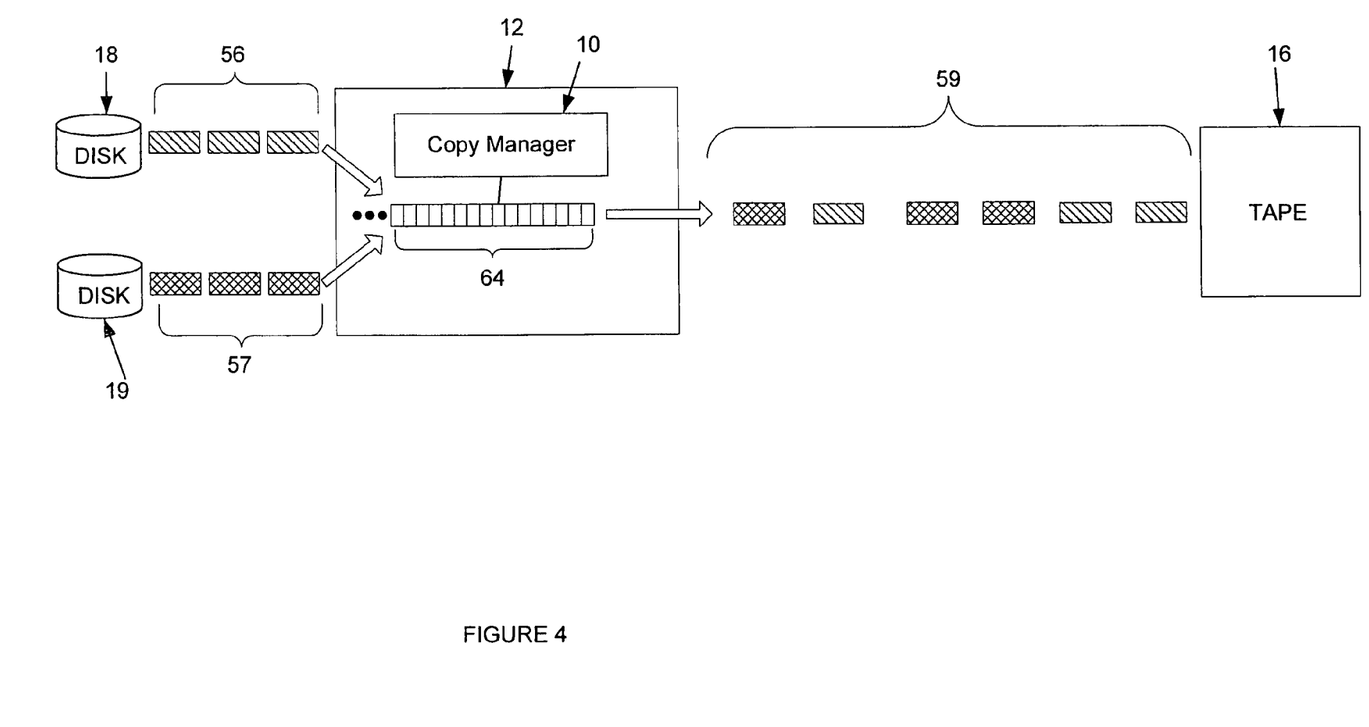
FIG. 4 is a diagrammatic representation of one embodiment of data flows at an example routing device for handling concurrent extended copy commands.

FIG. 4 is a diagrammatic representation of one embodiment of a data flow at routing device 12 for handling concurrent extended copy commands. In the example of FIG. 4, routing device 12 processes two extended copy commands concurrently, though routing device 12 may implement any number of concurrent extended copy commands based on available resources. One embodiment for dynamically controlling resources for concurrent extended copy commands is described in U.S. Pat. No. 6,704,836, entitled "Method for Dynamic Control of Concurrent Extended Copy Tasks" to Griswold and Justiss, issued Mar. 9, 2004, which is hereby fully incorporated by reference herein. For each extended copy command, routing device 12 issues read commands for blocks of data from a source device using the segment descriptors in the extended copy commands. The read commands can specify data blocks of a particular size, say 256 kb. The routing device can further construct write commands to write the data received from the source device to a destination device blocks of data, say 64 kb. It should be noted that term "block" as used herein should be construed to include blocks of data that have any appropriate size and/or formatting and it is not necessary that all of the blocks have the same size and formatting, so long as the blocks can be delineated. Moreover, the block sizes for the read and write commands specified above are given by way of example only and the read and write commands specify any arbitrarily defined block size.

In FIG. 4, the data flow from hard disk drive 18 is represented by data flow 56 and the data flow from hard disk drive 19 is represented by data flow 57. Blocks of data from each source device may arrive in any order. As data arrives, the data can be placed in buffers 64. According to one embodiment of the present invention, each buffer can be approximately 16 kb so that each block of data from a read command requires approximately 16 buffers and each write command empties approximately 4 buffers. The number of buffers used and the overall capacity of buffers 64, along with the read and write block sizes, can be used to determine if routing device 12 has sufficient resources available to handle additional extended copy commands.

Buffers 64 can, according to one embodiment of the present invention, act as a FIFO queue in which data is written from buffers 64 to the destination device in the order in which it received. The FIFO queuing can be implemented, for example, through software programming that can maintain one or more pointers to physical memory locations in buffers 64 or through other queuing mechanisms known in the art.

Buffers 64 can have a low-water mark associated with them. After one or more read commands are issued and the corresponding data is stored in buffers 64, write commands can be issued to transfer the data from buffers 64 to a destination device. When the amount of data falls below the low-water mark, additional read commands can be issued to obtain more data from source devices, unless no additional data needs to be transferred from the source devices.

As data is stored in buffers 64, copy manager program 10 can create a write command to write data to the destination device. Each write command will only write data received based on a particular extended copy command and, optionally, associated metadata from the extended copy command. In other words, a particular write command will only write data from a single thread. Additionally, copy manager program 10 can accumulate metadata from the segment descriptors (e.g., from the "inline to stream" or "embedded to stream" segment descriptors) in the extended copy commands and write metadata to the destination device. The metadata can specify, for example, a thread identification and sequence for particular blocks of data. Each block of data written to a destination device based on the same extended copy command can be assigned the same thread identification. The metadata can also indicate the order of the write command in a thread. Because the metadata can identify both the thread with which a particular block of data is associated and the order in which the block is written, a particular thread can be recreated. The content of the metadata and manner in which metadata is written to the destination device for a particular block of data can occur according to the NCITS T10 SPC-2 Extended Copy Command specification. Formatting and writing metadata can also occur according to other mechanisms known or developed in the art.

Dataflow 59 to destination device 16 can include blocks of data corresponding to the various extended copy commands intermingled together. Blocks of data corresponding to the different extended copy commands (i.e., the different threads) may arrive at the routing device 12 at different rates. Moreover, there is typically no synchronization between threads. Therefore, data blocks corresponding to the different threads can arrive in an essentially random pattern. The blocks of data from the various threads can be multiplexed into a single data flow to destination device 12. Because the data blocks arrive at routing device 12 randomly, they can be randomly intermingled in data flow 59 to destination device 16. Each block in data flow 59 can include metadata that, for example, indicates the thread to which the block belongs and the sequence in which the block is written.

According to one embodiment of the present invention, destination device 16 can be a sequential destination device and routing device 12 can stream data flow 59 to destination device 16. If destination device 16 is a high-speed streaming device that can receive data more quickly than data can be read from the source devices, embodiments of the present invention can keep data flow 59 streaming by using data from multiple source devices. This can prevent loss of streaming and reduce data gaps that can be caused by systems that only sequentially execute extended commands to the same destination device. The threads of data can be retrieved from the sequential access destination device as described in the U.S. patent application Ser. No. 10/636,042 entitled "System and Method for Manipulating and Reporting a Log of Multi-Threaded Backups" by Justiss and Sims, filed Aug. 7, 2003, through reading all the blocks of data, reading the metadata and extracting blocks belonging to particular threads, by using a log maintained by the copy manager program or according to other schemes known or developed in the art.

Figure 5:
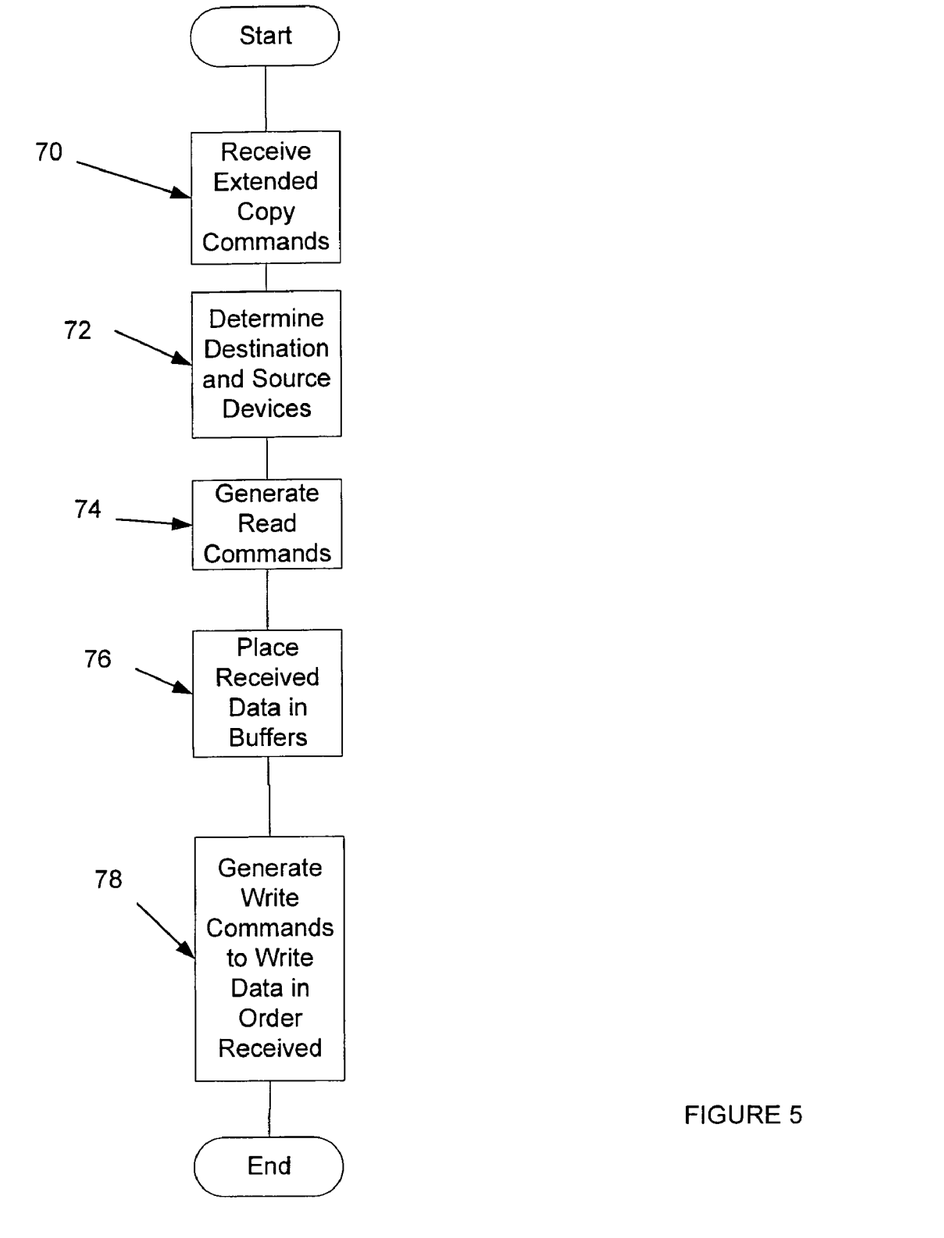
FIG. 5 is a flow chart illustrating one embodiment of a method for processing concurrent extended copy commands according to one embodiment of the present invention.

FIG. 5 is a flow chart illustrating one embodiment of a method for processing concurrent extended copy commands according to one embodiment of the present invention. The methodology of FIG. 5 can be implemented, for example, as a set of computer executable instructions (a "copy manager program") stored on a computer readable medium. At step 70, the copy manager program can receive multiple extended copy commands referencing the same destination device. The copy manager program, at step 72, can determine the destination device for the extended copy commands and the source devices for the extended copy commands. At step 74, the copy manager program can issue read commands based on the segment descriptors in the extended copy commands to the source devices and, at step 76, place any received data in a set of buffers. The copy manager program, at step 78, can form one or more write commands to write data to the destination device in the order it was received (i.e., in a FIFO manner). Because the data written to the destination device is written out in the order it is received, the data flow to the destination device can include intermingled data corresponding to multiple threads (i.e., can include intermingled data blocks corresponding to multiple extended copy commands). In writing the data to the destination device, the copy manager program can also write metadata to the destination device that can be used, for example, to reconstruct the various threads. The metadata can be extracted from the extended copy commands. The process of FIG. 5 can be arbitrarily repeated as needed or desired.

Figure 6A:
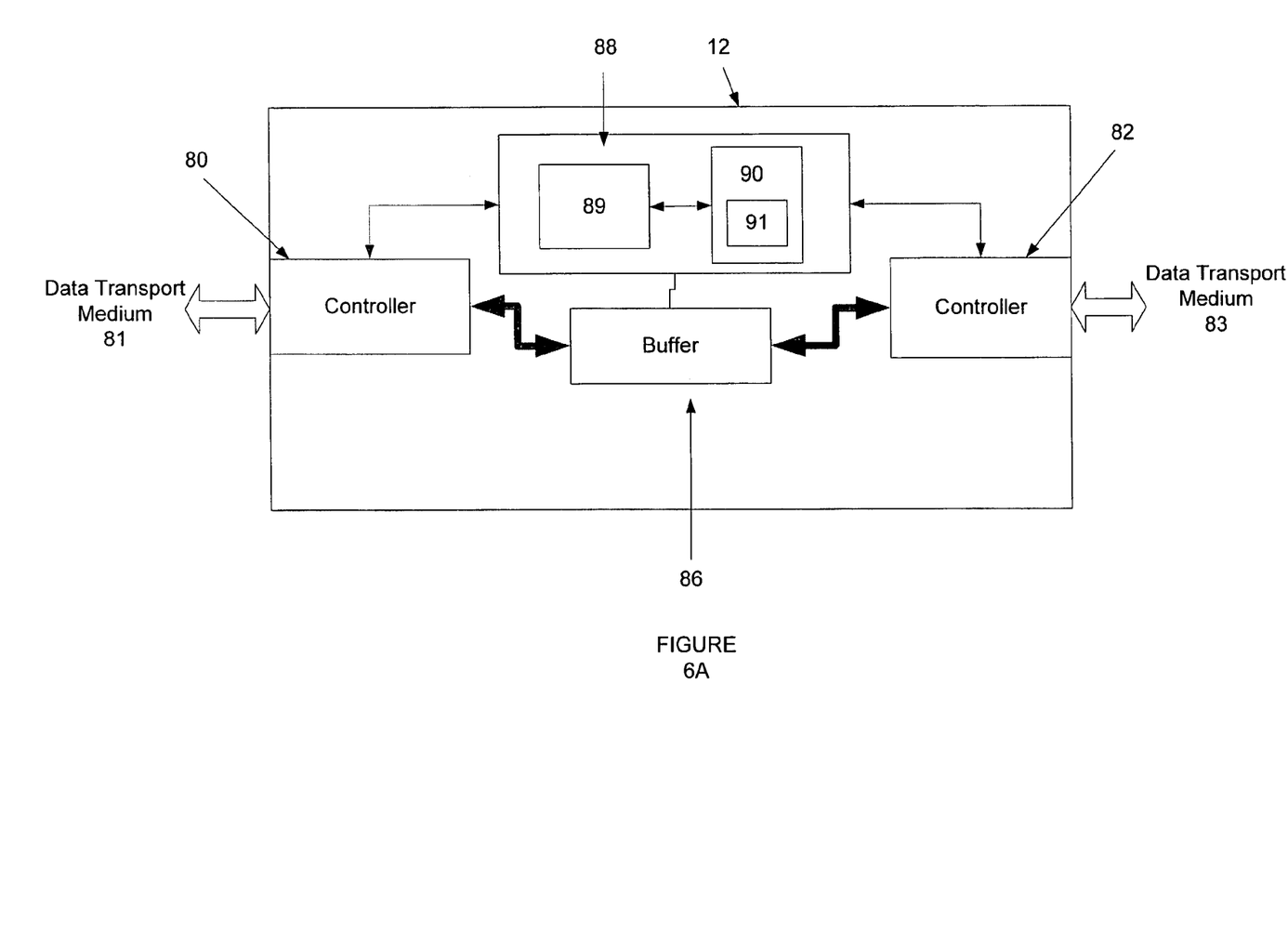
FIG. 6A is a diagrammatic representation of one embodiment of a routing device that can act as a copy manager device and FIG. 6B is a diagrammatic representation of a data flow at the routing device of FIG. 6A.

FIG. 6A is a diagrammatic representation of one embodiment of a routing device 12 in which multiple extended copy commands can be processed according to embodiments of the present invention. Routing device 12 can comprise a first transport medium controller 80 that interfaces with a first transport medium 81 and a second transport medium controller 82 that interfaces with a second transport medium 83. In one embodiment of the present invention, the first transport medium 81 can be a Fibre Channel transport medium, the second transport medium 83 a SCSI bus, controller 80 a Fibre Channel controller, such as a fibre channel controller based on the TACHYON family of fibre channel control chips and controller 82 a SCSI controller. TACHYON fibre channel control chips are a product of Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5400x, where x is the Rev A, B, C, etc.), the DX4 (HPFC-5700x, where x is the Rev A, B, C, etc.).

In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and SATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and SATA; Fibre Channel and Fibre Advanced Technology Attachment ("FATA"); SATA and Fibre Channel; Fibre Channel and Serial SCSI Architecture; Serial SCSI Architecture and Fibre Channel; Infiniband and Serial Attached SCSI; Serial Attached SCSI and Infiniband. Moreover, the transport media can operate according to other protocols. Additionally, the various transport media can carry commands according to a variety of command protocols including, but not limited to, SCSI-1, SCSI-2, SCSI-3, SPC-1 and SPC-2.

A set of buffers 86 provides memory work space and is connected to both controller 80 and to controller 82. Buffers 86 can queue data corresponding to extended copy commands. A processing unit 88 can be connected to controller 80, controller 82 and buffers 86. According to one embodiment of the present invention, processing unit 88 comprises one or more processors 89 for controlling operation of routing device 12, handling address mapping and security access and converting commands between protocols and a computer readable medium 90 accessible by the processor 89 storing a set of computer instructions 91 that are executable by the processor. Computer instructions 91 can include instructions to implement a copy manager program. According to other embodiments of the present invention buffers 86 and/or computer readable medium 91 can be onboard processor 89.

In one implementation (not shown), the routing device 12 can be a rack mount or free standing device with an internal power supply. Routing device 12 can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of routing device 12 can support SCSI direct and sequential access target devices and can support SCSI initiators, as well. The Fibre Channel port can interface to SCSI-3 FCP enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVER SYSTEMS VXWORKS kernel. In addition, the routing device can include software as required to control functions of the various elements, convert commands and responses between command protocols and generate commands and provide appropriate translations between the FC and SCSI data transport protocols (and for other protocol if necessary for other embodiments).

Figure 6B:
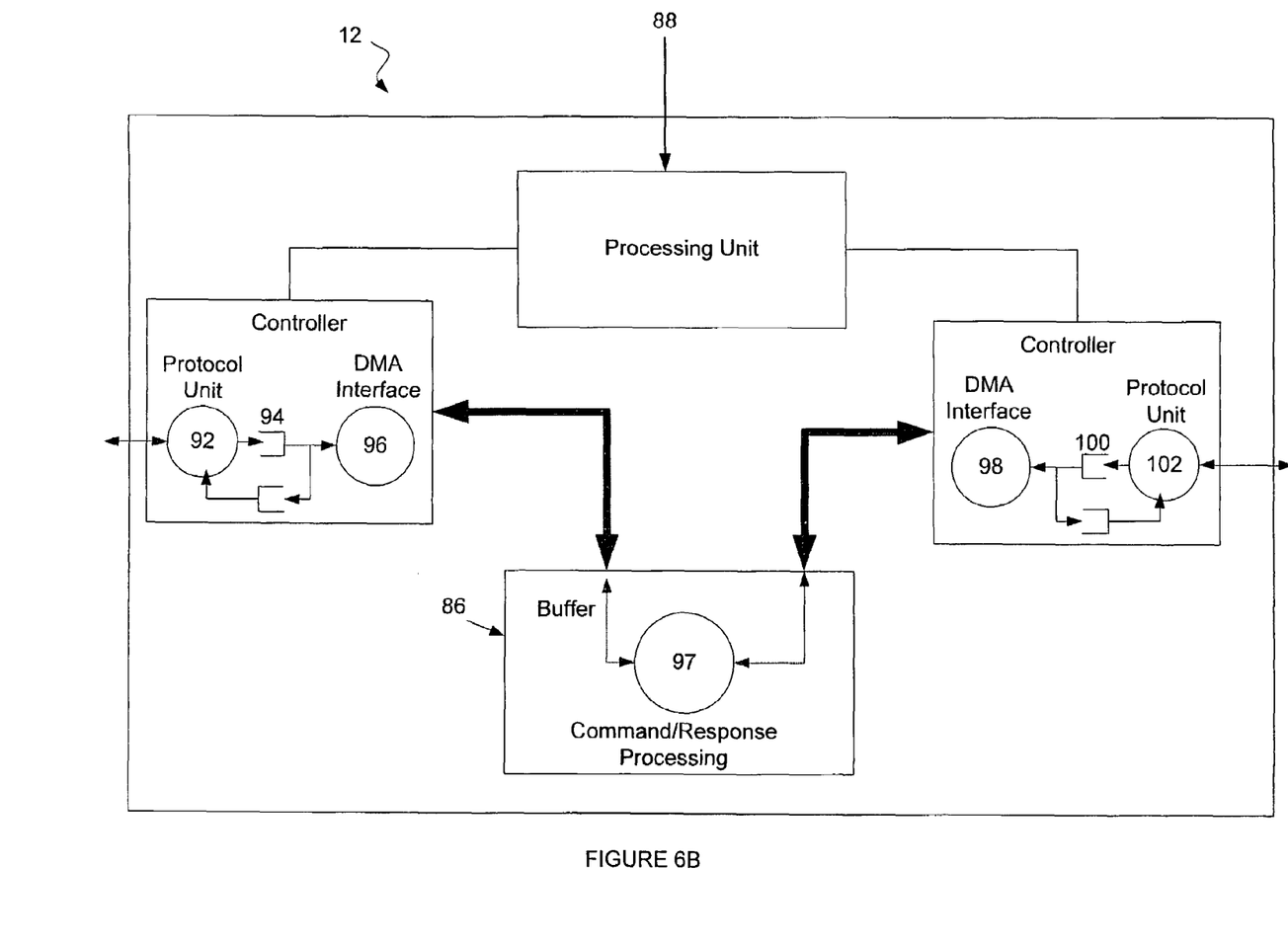

FIG. 6B is a block diagram of one embodiment of data flow within the routing device 12 of FIG. 6A. As shown, data from first transport medium 81 (e.g., the Fibre Channel transport medium) is processed by a protocol unit 92 (e.g., a Fibre Channel protocol unit) and placed in a FIFO queue 94. A direct memory access (DMA) interface 96 can then take data out of FIFO queue 94 and places it in buffers 86.

Processing unit 88 processes the data in buffer 86 as represented by processing 97. This processing can include mapping between the first data transport protocol and the second data transport protocol, mapping between command protocols, applying access controls, queuing data blocks in a FIFO queue and routing functions. A DMA interface 98 then pulls data from buffer 86 and places it into a buffer 100. A second protocol unit 102 pulls data from buffer 100 and communicates the data on the second transport medium 83 (e.g., the SCSI bus). Data flow in the reverse direction, from the second data transport medium 83 to the first data transport medium 81, can be accomplished in a reverse manner.

It should be noted that the example of the routing device of FIGS. 6A and 6B is provided by way of example. Embodiments of the present invention can be implemented in routing devices such as routers, bridges, hubs or other routing devices in the command path. Additionally, embodiments of the present invention can be implemented has hardware and/or software programming. Embodiments can be implemented as computer instructions stored on any computer readable medium known in the art (e.g., optical disk, magnetic disk, flash memory, RAM, ROM, EEPROM or other computer readable medium).

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A method for processing multiple Small Computer System Interface (SCSI) extended copy commands, comprising:
   at a copy manager, wherein the copy manager is a network device running a copy manager program:
   receiving SCSI extended copy commands from one or more host applications running on one or more computers communicatively coupled to the copy manager, wherein each of the SCSI extended copy commands specifies a thread of data blocks to be moved from one or more source devices in a storage area network (SAN) to a destination device in the SAN;
   concurrently executing at least two SCSI extended copy commands that specify data transfer from multiple source devices to a storage device in the SAN, wherein concurrently executing the at least two SCSI extended copy commands further comprises:
   building one or more read commands for each segment descriptor in the at least two SCSI extended copy commands;
   issuing the read commands to the multiple source devices in the SAN;
   receiving blocks of data from the multiple source devices, wherein the blocks of data correspond to different threads specified in the at least two SCSI extended copy commands;
   interleaving the threads in a queue internal to the copy manager;
   as the blocks of data are stored in the queue, creating write commands and accumulating metadata, wherein each of the write commands corresponds to a particular SCSI extended copy command and wherein the metadata for each block of data comprises a thread identification and a sequence in which the block of data is written; and
   streaming the blocks of data from the copy manager to the storage device in the SAN in the order received from the multiple source devices.

2. The method of claim 1, further comprising associating the queue internal to the copy manager with a low-water mark.

3. The method of claim 1, wherein the blocks of data stored in the queue fall below a low-water mark, further comprising issuing additional read commands to obtain more data from the multiple source devices.

4. The method of claim 1, wherein issuing the read commands to the multiple source devices in the SAN further comprises issuing one or more read commands specifying a read block size.

5. The method of claim 4, wherein creating write commands further comprises constructing one or more write commands specifying a write block size, wherein the read block size is different from the write block size.

6. The method of claim 5, further comprising determining whether the copy manager has sufficient resources available to handle additional extended copy commands based on an overall capacity of the queue internal to the copy manager and the read and write block sizes.

7. The method of claim 1, wherein the storage device in the SAN is capable of receiving the blocks of data from the copy manger faster than the blocks of data are read from the multiple source devices.

8. The method of claim 1, wherein the blocks of data corresponding to the at least two SCSI extended copy commands arrive at the copy manger at different rates.

9. The method of claim 1, wherein the storage device comprises a magnetic tape device, a magnetic disk device, an optical media device, or a write once media device.

10. The method of claim 1, wherein the multiple source devices comprise random access source devices.

11. An apparatus for processing multiple Small Computer System Interface (SCSI) extended copy commands, comprising:
    a computer memory having a plurality of memory locations for implementing a queue;
    a processing unit connected to the computer memory; and
    a computer readable storage medium accessible by the processing unit and storing a copy manager program translatable to:
    receive SCSI extended copy commands from one or more host applications running on one or more computers communicatively coupled to the apparatus, wherein each of the SCSI extended copy commands specifies a thread of data blocks to be moved from one or more source devices in a storage area network (SAN) to a destination device in the SAN;
    concurrently execute at least two SCSI extended copy commands that specify data transfer from multiple source devices to a storage device in the SAN, wherein concurrently executing the at least two SCSI extended copy commands further comprises:
    building one or more read commands for each segment descriptor in the at least two SCSI extended copy commands;
    issuing the read commands to the multiple source devices in the SAN;
    receiving blocks of data from the multiple source devices, wherein the blocks of data correspond to different threads specified in the at least two SCSI extended copy commands;
    interleaving the threads in the queue;

as the blocks of data are stored in the queue, creating write commands and accumulating metadata, wherein each of the write commands corresponds to a particular SCSI extended copy command and wherein the metadata for each block of data comprises a thread identification and a sequence in which the block of data is written; and streaming the blocks of data to the storage device in the SAN.

12. The apparatus of claim 11, wherein the copy manager program is further translatable to associate the queue with a low-water mark.

13. The apparatus of claim 11, wherein the copy manager program is further translatable to issue additional read commands to obtain more data from the multiple source devices when the blocks of data stored in the queue fall below a low-water mark.

14. The apparatus of claim 11, wherein the copy manager program is further translatable to issue one or more read commands specifying a read block size.

15. The apparatus of claim 14, wherein the copy manager program is further translatable to construct one or more write commands specifying a write block size, wherein the read block size is different from the write block size.

16. The apparatus of claim 11, further comprising a first interface to a fibre channel data transport medium and a second interface to a SCSI data transport medium.

17. The apparatus of claim 16, wherein the copy manager program is further translatable to receive SCSI extended copy commands from host applications over the fibre channel data transport medium.

18. The apparatus of claim 16, wherein the copy manager program is further translatable to read data from the multiple source devices over the fibre channel data transport medium and write data to the storage device in the SAN over the SCSI data transport medium.

19. The apparatus of claim 18, wherein the multiple source devices comprise random access source devices and wherein the storage device comprises a magnetic tape device, a magnetic disk device, an optical media device, or a write once media device.

20. A computer program product comprising a computer readable storage medium having computer program instructions embodied therein, wherein the computer program instructions are translatable by a processor to:

receive SCSI extended copy commands from one or more host applications running on one or more computers, wherein each of the SCSI extended copy commands specifies a thread of data blocks to be moved from one or more source devices in a storage area network (SAN) to a destination device in the SAN;

concurrently execute at least two SCSI extended copy commands that specify data transfer from multiple source devices to a storage device in the SAN, wherein concurrently executing the at least two SCSI extended copy commands further comprises:

building one or more read commands for each segment descriptor in the at least two SCSI extended copy commands;

issuing the read commands to the multiple source devices in the SAN;

receiving blocks of data from the multiple source devices, wherein the blocks of data correspond to different threads specified in the at least two SCSI extended copy commands;

interleaving the threads in a queue;

as the blocks of data are stored in the queue, creating write commands and accumulating metadata, wherein each of the write commands corresponds to a particular SCSI extended copy command and wherein the metadata for each block of data comprises a thread identification and a sequence in which the block of data is written; and streaming the blocks of data to the storage device in the SAN.

21. The computer program product of claim 20, wherein the computer program instructions are further translatable to associate the queue with a low-water mark.

22. The computer program product of claim 20, wherein the computer program instructions are further translatable to issue additional read commands to obtain more data from the multiple source devices when the blocks of data stored in the queue fall below a low-water mark.

23. The computer program product of claim 20, wherein the computer program instructions are further translatable to issue one or more read commands specifying a read block size.

24. The computer program product of claim 23, wherein the computer program instructions are further translatable to construct one or more write commands specifying a write block size, wherein the read block size is different from the write block size.

25. The computer program product of claim 20, further comprising a first interface to a fibre channel data transport medium and a second interface to a SCSI data transport medium.

26. The computer program product of claim 20, wherein the computer program instructions are further translatable to receive SCSI extended copy commands from host applications over a fibre channel data transport medium.

27. The computer program product of claim 20, wherein the computer program instructions are further translatable to read data from the multiple source devices over a fibre channel data transport medium and write data to the storage device in the SAN over a SCSI data transport medium.

28. The computer program product of claim 27, wherein the multiple source devices comprise random access source devices and wherein the storage device comprises a magnetic tape device, a magnetic disk device, an optical media device, or a write once media device.

* * * * *